Sept. 23, 1930.  F. W. MILLER  1,776,364
PROCESS OF MAKING BIMETALLIC STRIPS, PLATES, OR THE LIKE
Filed Nov. 11, 1927

INVENTOR
FREDERICK W. MILLER
BY
Richards & Geier
ATTORNEYS

Patented Sept. 23, 1930

1,776,364

UNITED STATES PATENT OFFICE

FREDERICK WILLIAM MILLER, OF HOCKLEY HEATH, ENGLAND; OLIVE MILLER AND FREDERICK MILLER ADMINISTRATORS OF SAID FREDERICK W. MILLER, DECEASED

PROCESS OF MAKING BIMETALLIC STRIPS, PLATES, OR THE LIKE

Application filed November 11, 1927, Serial No. 232,573, and in Great Britain November 26, 1926.

This invention relates to the manufacture of bi-metallic or compound metallic strips, plates or the like, such as for use in thermostats, by the fusing of one metal on to the surface of another metal having a higher melting point.

The object of the present invention is to provide an improved process of uniting the two metals together whereby oxidation of the opposed surfaces of the said metals is effectively prevented during the fusing of the one metal on to the other, and whereby a better and more intimate connection between the said metals is obtained.

Figure 1 of the accompanying drawings is a sectional view through the crucible in which the two metals are to be placed, a metal plate being shown laid therein and covered with a layer of powdered glass, prior to the other metal being fused on to the said plate.

Figure 1:
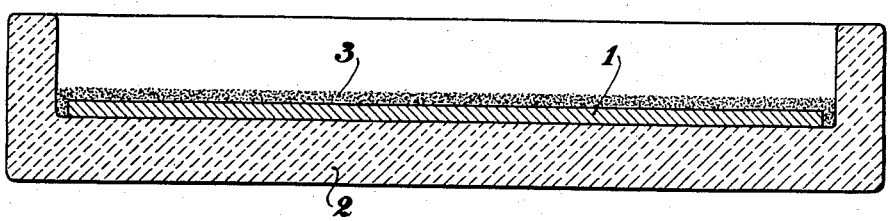
Figure 2:
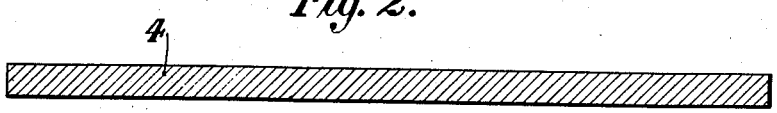
Figure 2 is a similar view, but shows the glass fused on the surface of the plate, and also shows a second metal plate of lower melting point before being laid upon and fused on to the first-named plate.
Figure 2:
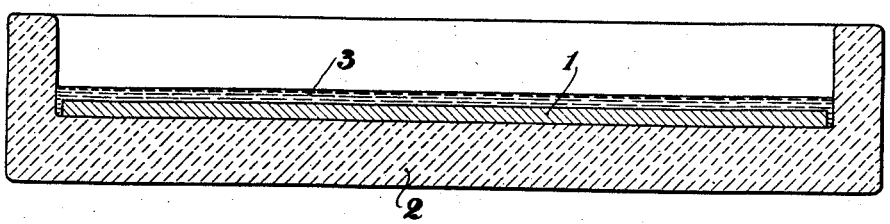
Figure 3:
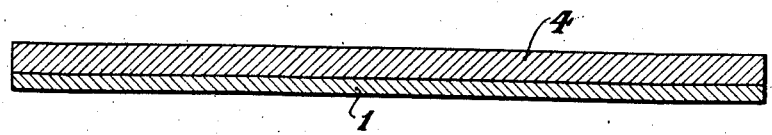
Figure 3 is a section through the completed bi-metallic plate.

In carrying out the invention as applied to the manufacture of a bi-metallic material for use in connection with thermostats, the said material is composed of two metals having different co-efficients of expansion, namely, nickel-steel and brass, the brass being fused on to the nickel-steel so as to adhere closely thereto. For this purpose a plate 1 of nickel steel is placed upon the bottom of a crucible or fire-clay dish 2, as shown in the drawing, the bottom of the crucible being slightly larger than the said plate to allow for expansion. A layer of powdered glass 3, or like vitreous material, is then applied to the surface of the plate 1 so as entirely to cover the latter. The crucible is then placed in a muffle or furnace so as to raise the temperature of the metal plate and glass sufficient to cause the glass to fuse and spread uniformly over and cover completely the surface of the plate. A plate of brass 4 (see Figure 2) is meanwhile heated to nearly its fusing point, and this hot brass plate is laid upon the fused glass 3. The said plate sinks through and displaces the said glass, until it rests upon the surface of the nickel-steel plate 1. The crucible is then further heated so as to raise the temperature of its contents sufficiently high to fuse the brass plate 4 but without fusing the nickel-steel plate 1, which has a higher melting point than brass. After cooling it will be found that the brass has closely and intimately united with or adhered to the nickel-steel, as shown in Figure 3, admitting of the thermostatic material or bi-metallic plate being rolled out to the required thickness without the two metals separating. After rolling, the plates may be cut into strips of the desired size. During the fusing of the brass, the fused glass prevents access of air to the surfaces of the metals to be joined, and thus avoids oxidation. Instead of the brass being applied to the nickel-steel in the form of a plate, it may be in granular form.

Any suitable metals having different co-efficients of expansion and which will adhere to one another, may be employed instead of brass and nickel-steel.

Further, the invention is applicable to the joining together of two different metals of any kind and for any purpose.

The upper surface of the nickel-steel or metal of higher melting point may be smooth, but preferably it has a grained undercut surface produced by treating it with a mixture of sulphuric and nitric acids with a small percentage of bicromate of potash, the treatment being continued for a sufficient length of time to produce the desired undercut surface. The brass or other fused metal by this means obtains a better and more intimate adhesion to the nickel-steel or the like.

Where in the claims I employ the term "non-metallic fusible material having a relatively high melting point", I mean to include all such non-metallic substances as are capable of forming a coating on a metal plate and will not immediately fuse and ball up when touched by a hot plate but will become liquid comparatively slowly and will not roll off the surface or occlude air.

Having fully described my invention, what

I desire to claim and secure by Letters Patent is:—

1. A process of making bi-metallic strips or plates, such as for use in thermostats, consisting in applying a layer or coating of powdered vitreous material to the surface of a metal plate, heating the plate and vitreous material in a furnace so as to cause the latter to fuse and cover the metal plate, applying to the fused vitreous material a layer of unfused metal having a lower melting point than that of the plate, and subjecting the whole to the action of heat in order to fuse the said layer of applied metal so that it displaces the fused vitreous material and adheres to the surface of the metal plate.

2. A process of making bi-metallic strips or plates, such as for use in thermostats, consisting in covering a metal plate with a non-metallic fusible material having a relatively high melting point, heating the plate and fusible material until the said material fuses, applying to the fused material a layer of preheated, unfused metal of lower melting point than that of the plate, and subjecting the whole to the action of heat in order to fuse the applied metal and cause it to adhere to the plate.

3. A process of making bi-metallic strips or plates consisting in treating one face of a metal plate with acid for a sufficient length of time to form a grained undercut surface, placing the said plate in a crucible with the acid-treated face uppermost, covering the said upper surface of the plate with a layer of powdered vitreous material, heating the plate and vitreous material in a furnace so as to fuse the said vitreous material on to the metal plate, applying to the fused vitreous material a layer of unfused metal having a lower melting point than that of the plate, and subjecting the whole to the action of heat in order to fuse the said layer of applied metal so that it displaces the fused vitreous material and adheres to the surface of the metal plate.

4. A process of making bi-metallic strips or plates consisting in treating one face of a metal plate with acid for a sufficient length of time to form a grained undercut surface, placing the said plate in a crucible with the acid-treated face uppermost, covering the said upper surface of the plate with a non-metallic fusible material having a relatively high melting point, heating the plate and fusible material until the said material fuses, applying to the fused material a layer of pre-heated, unfused metal of lower melting point than that of the plate, and subjecting the whole to the action of heat in order to fuse the applied metal and cause it to adhere to the plate.

5. A process of making bi-metallic strips or plates consisting in treating one face of a metal plate with a mixture of sulphuric and nitric acids containing a small percentage of bichromate of potash for a sufficient time to form a grained undercut surface, placing the said plate in a crucible with the acid-treated face uppermost, covering the said upper surface of the plate with a layer of powdered glass, heating the plate and glass in a furnace so as to fuse the said glass on to the metal plate, applying to the fused glass a uniform layer of unfused metal having a lower melting point than that of the plate, and subjecting the whole to the action of heat in order to fuse the said layer of applied metal so that it displaces the fused glass and adheres to the surface of the metal plate.

6. A process of making bi-metallic strips or plates consisting in treating one face of a metal plate with a mixture of sulphuric and nitric acids containing a small percentage of bichromate of potash for a sufficient time to form a grained undercut surface, placing the said plate in a crucible with the acid-treated face uppermost, covering the said upper surface of the plate with a non-metallic fusible material having a relatively high melting point, heating the plate and fusible material until the said material fuses, applying to the fused material a layer of pre-heated, unfused metal of lower melting point than that of the plate, and subjecting the whole to the action of heat in order to fuse the applied metal and cause it to adhere to the plate.

In testimony whereof I have affixed my signature.

FREDERICK WILLIAM MILLER.